United States Patent Office 2,707,615
Patented May 3, 1955

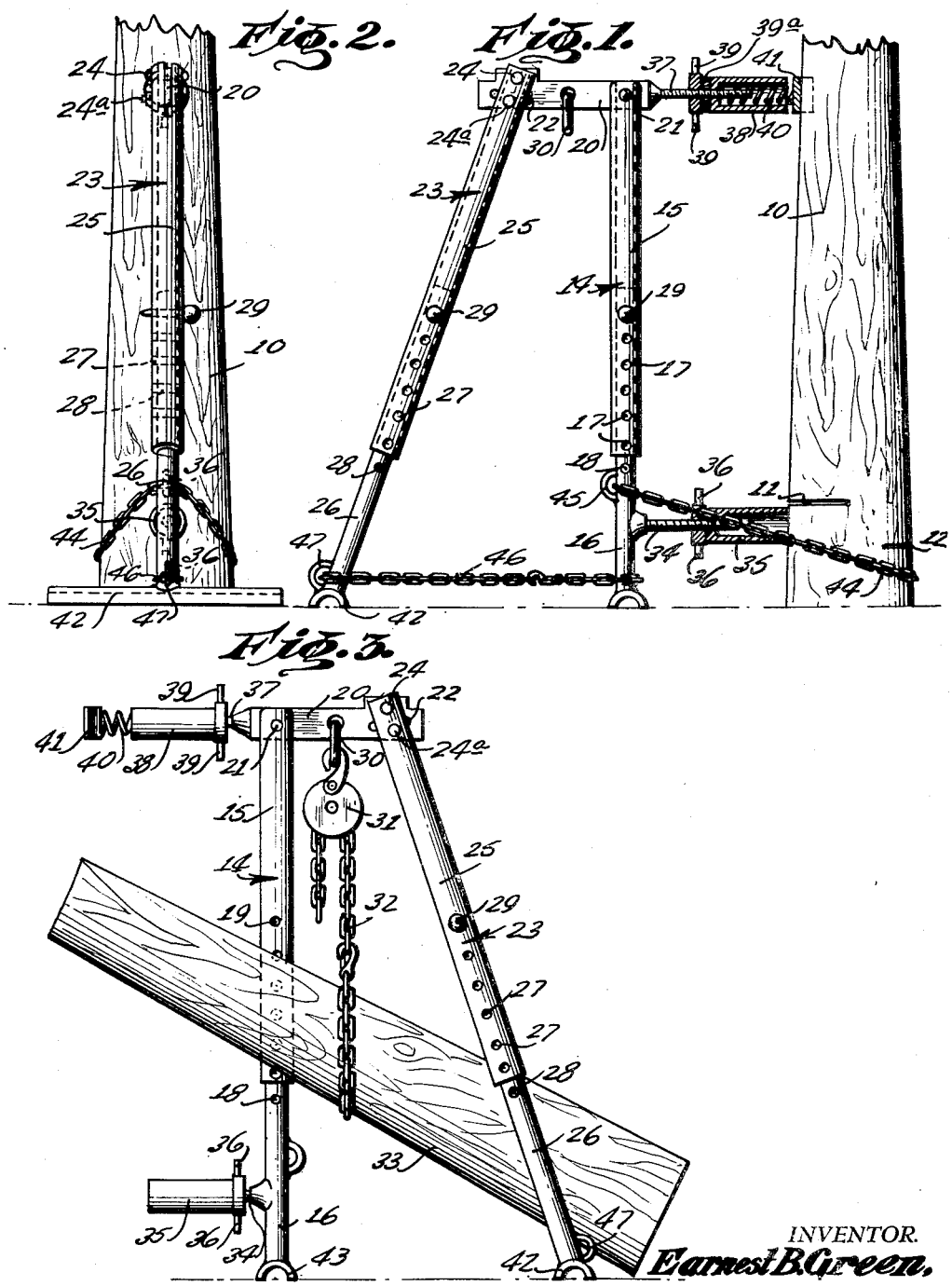

2,707,615

TWO-WAY TIMBER JACK

Earnest B. Green, Vernal, Utah

Application March 25, 1954, Serial No. 418,629

1 Claim. (Cl. 254—100)

This invention relates to a timber jack for use in felling and handling trees, logs and the like.

The object of the invention is to provide a timber jack which will enable trees to be felled and handled with great ease and safety.

Another object of the invention is to provide a timber jack which can be adjusted and wherein damage to saws and the like will be prevented and there will also be effected a saving in time in felling trees.

A further object of the invention is to provide a timber jack which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view, with parts broken away and in section, showing the timber jack of the present invention being used for felling a tree.

Figure 2 is an end elevational view of the assembly of Figure 1.

Figure 3 is a side elevational view of the timber jack showing a modification wherein a log is being hoisted.

Referring in detail to the drawings, the numeral 10 designates a tree to be felled, Figures 1 and 2, and before the tree 10 is felled it is provided with a pair of oppositely positioned cuts 11 and 12. The cuts 11 and 12 can be made in any suitable manner, as for example by a saw.

The present invention is directed to a timber jack which is adapted to be used for felling the tree 10 while the cut 11 is being made therein. The timber jack includes a vertically disposed standard 14 which comprises a hollow tube 15 having an open lower end, and telescopically or slidably mounted in the tube 15 is a leg 16. The tube 15 is provided with a plurality of spaced openings 17 which are adapted to register with openings 18 in the leg 16. A suitable pin 19 is adapted to be extended through the registering openings 17 and 18 in order to maintain the standard 14 immobile in its various adjusted positions.

A pin 21 pivotally connects an end of a bar 20 to the upper end of the tube 15, and the bar 20 is provided with a plurality of spaced openings 22. A brace 23 includes a hollow casing 25 and a rod 26 telescopically mounted therein. The upper end of the casing 25 is pivotally connected to the bar 20 by means of a bolt 24 to permit the brace 23 to be adjusted angularly with relation to the standard 14. The openings 22 are arranged in the arc of a circle having the bolt 24 for its center. A bolt 24a passing through the upper end of the brace 23 and one of these openings holds the brace against accidental movement from its adjusted position. The casing 25 is provided with a plurality of spaced openings 27, and the rod 26 has a plurality of spaced openings 28, there being a pin 29 which is adapted to be extended through the desired openings 27 and 28 for maintaining the rod 26 immobile in its various adjusted positions in the casing 25.

At times the timber jack of the present invention can be used for hoisting or handling logs such as the logs 33 instead of being used for felling a tree such as the tree 10. Thus, as shown in Figure 3 when a log such as the log 33 is to be hoisted, a pulley block 31 may be arranged in engagement with a ring 30 which is secured to the bar 20, and a chain 32 can be trained over the pulley block 31 and arranged in engagement with the log 33 to be hoisted.

Projecting from the leg 16 is a threaded screw member 34, and slidably mounted on the screw member 34 is a bracket 35. The bracket 35 is adapted to be adjusted by means of a nut with handles 36, and the end of the bracket 35 is adapted to abut against the trunk of the tree 10 as shown in Figure 1.

By rotating the handles 36 the spacing of the standard 14 from the tree 10 can be varied as desired.

Projecting from the bar 20 is a threaded stem 37, and adjustably mounted on the stem 37 is a sleeve 38. A coil spring 40 has a portion thereof positioned in the sleeve 38, and a nut with handles 39 are provided for adjusting the sleeve 38. A shoe 41 is secured as by welding to the outer end of the coil spring 40, and the shoe 41 is adapted to engage a portion of the tree 10 being felled. The members 35 and 38 are separate from their respective nuts with handles and these members 35 and 38 are free to move longitudinally on the screw members.

Shoes 42 and 43 are secured to the lower ends of the rod 26 and leg 16, respectively, in order to impart stability to the jack of the present invention. A chain 44 is trained around the tree trunk, and the chain 44 also extends around a portion of the leg 16, there being an eye 45 for maintaining the chain 44 in place on the leg 16. The chain 44 serves to maintain the jack in its proper position against the tree when manual pressure is applied on the handles 39 as when the tree is being felled. A chain 46 extends between the leg 16 and rod 26, and the chain 46 extends through an eye 47 on the rod 26, the chain 46 serving to keep the leg 16 and rod 26 in their proper spaced apart relation and to prevent excessive spreading of these members.

From the foregoing it is apparent that a timber jack has been provided which is especially suitable for use in felling or handling trees, logs and the like. In use, the timber jack can be arranged as shown in Figures 1 and 2 while the notches or cuts 11 and 12 are being made in the tree 10. Then, the spring 40 will exert pressure on the tree 10 above the cuts to thereby cause the tree to be felled and if desired additional pressure can be exerted on the tree through the medium of the jack 41 by rotating the nut with handles 39 in the proper direction. By rotating the nut with handles 36 the bracket 35 can be adjusted to engage the tree trunk whereby the jack can be positioned at the proper distance from the tree. The length of the upright 23 and the standard 14 can be adjusted by removing the pins 29 and 19, and the chain 44 maintains the jack attached to the tree.

If it is desired to use the device for hoisting a trunk or tree portion 33, as shown in Figure 3, the pulley block 31 is arranged in engagement with the ring 30 and then the chain 32 is engaged with the log 33 so that the log 33 can be readily lifted or hoisted.

The plurality of openings 22 permit the upright 23 to be adjusted to various positions so that varying amounts of presure can be applied against the tree. A suitable roller bearing 39a may be located between the jack sleeve 38 and the nut with handles 39 in order to reduce friction. The chain 44 maintains the jack steady against the tree until it falls, and the jack can be made for any size timber. The spring 40 keeps the tree moving in the right direction as it is being sawed down. The present invention is simple to use and the device will generate sufficient pressure through the medium of the spring 40 to topple over any size tree as it is being sawed or cut down. Thus, there will be no pinching of saws and personnel will not be endangered. Further, the tree can be felled in any direction desired. Roller bearings can be arranged contiguous to the nuts with handles 39 and 36 to insure smooth operation thereof.

I claim:

A timber jack comprising a vertically disposed standard embodying an upper hollow vertically disposed tube, a leg telescopically mounted in the lower end of said tube, there being a plurality of spaced openings in said tube and leg, a pin extending through selected alined ones of said openings, a horizontally disposed bar pivotally connected to the upper end of said tube, an inclined upright including a casing pivotally connected to said bar, a rod telescopically mounted in the lower portion of said casing, there being a plurality of spaced openings in said casing and rod, a securing element extending through selected alined ones of the openings in said casing and rod arcuate shoes mounted on the lower ends of said leg and rod, a chain extending between the lower ends of said leg and rod, a horizontally disposed screw member secured to said leg, a hollow bracket adjustably connected to said screw member and adapted to bear against the lower portion of a tree trunk, a nut with handles on said screw member for adjusting said bracket, a threaded stem projecting from said bar and arranged above said screw member, a sleeve adjustably mounted on said stem, a coil spring positioned in said sleeve and extending beyond the end thereof, a shoe secured to the outer end of said coil spring and adapted to abut a tree to be felled, a nut with handles on said threaded stem for adjusting said sleeve, and a chain extending around said leg and around the lower portion of the tree trunk.

References Cited in the file of this patent

UNITED STATES PATENTS

| | | |
|---|---|---|
| 1,414,319 | Zaiauskis | Apr. 25, 1922 |
| 2,404,655 | Randall | July 23, 1946 |
| 2,426,694 | King | Sept. 2, 1947 |
| 2,542,852 | White | Feb. 20, 1951 |
| 2,667,902 | Whiteside | Feb. 2, 1954 |

FOREIGN PATENTS

| | | |
|---|---|---|
| 324,506 | France | Dec. 13, 1902 |
| 58,712 | Sweden | Apr. 28, 1925 |
| 695,239 | Germany | Aug. 20, 1940 |